United States Patent
Somanath et al.

(10) Patent No.: US 7,632,064 B2
(45) Date of Patent: Dec. 15, 2009

(54) VARIABLE GEOMETRY GUIDE VANE FOR A GAS TURBINE ENGINE

(75) Inventors: Nagendra Somanath, Manchester, CT (US); Keshava B. Kumar, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 627 days.

(21) Appl. No.: 11/515,102

(22) Filed: Sep. 1, 2006

(65) Prior Publication Data

US 2008/0056904 A1    Mar. 6, 2008

(51) Int. Cl.
*F04D 29/44* (2006.01)
*F04D 29/54* (2006.01)

(52) U.S. Cl. ............... 415/191; 60/796; 416/233

(58) Field of Classification Search .......... 415/191, 415/211.2, 208.2; 60/796, 797, 798; 416/233; 244/54

See application file for complete search history.

(56) References Cited

U.S. PATENT DOCUMENTS

| 4,695,220 | A | * | 9/1987 | Dawson | 415/9 |
|---|---|---|---|---|---|
| 5,314,301 | A | * | 5/1994 | Knight | 415/160 |
| 6,708,482 | B2 | | 3/2004 | Seda | |
| 6,843,638 | B2 | * | 1/2005 | Hidalgo et al. | 415/209.3 |
| 6,883,303 | B1 | | 4/2005 | Seda | |
| 6,884,030 | B2 | * | 4/2005 | Darkins et al. | 415/191 |
| 6,929,445 | B2 | * | 8/2005 | Zatorski et al. | 415/115 |
| 6,984,105 | B2 | * | 1/2006 | Clark et al. | 415/160 |
| 7,104,754 | B2 | * | 9/2006 | Willshee et al. | 415/159 |
| 7,114,911 | B2 | * | 10/2006 | Martin et al. | 415/1 |
| 7,527,471 | B2 | * | 5/2009 | Schilling | 415/118 |
| 2004/0265124 | A1 | * | 12/2004 | Liu et al. | 415/211.2 |

* cited by examiner

*Primary Examiner*—William H Rodríguez

(57) ABSTRACT

A variable geometry inlet guide vane for a gas turbine aircraft engine includes an aerodynamic shell for turning inlet flow to a turbine or compressor and an internal spar spaced from the airfoil shell by an air gap. A number of actuation mechanisms grounded to the spar and connected to the inner surface of the aerodynamic shell adjust the shape of the shell in response to varying operating conditions of the engine, imbalanced aerodynamic loading of the shell or vibration or other transient loads on the shell.

18 Claims, 3 Drawing Sheets

VARIABLE GEOMETRY GUIDE VANE FOR A GAS TURBINE ENGINE

BACKGROUND OF THE INVENTION

1. Technical Field

This invention relates generally to aircraft gas turbine engines and particularly to a turbine inlet guide vane therefor.

2. Background Art

The operation of turbofan gas turbine engines is well known. Such engines include a serial arrangement of a fan, low and high-pressure compressors, a combustor, and high and low-pressure turbines. Air admitted into the inlet of the engine is compressed by the engine's compressor. The compressed air is then mixed with fuel in the engine's combustor and burned. The high-energy products of combustion of the burned air fuel mixture (often referred to a "hot gas" or "working fluid") then enter the turbine which extracts energy from the mixture in order to drive the compressor and fan. That energy extracted by the turbine above and beyond that necessary to drive the compressor and fan, exits the engine at the core engine exhaust nozzle thereof, producing thrust which powers the associated aircraft. A significant and usually much larger amount of additional thrust is produced by the fan which is driven by the low-pressure turbine, taking in ambient air and accelerating the air to produce the additional thrust.

In two-spool gas turbine engines, the high-pressure compressor and high-pressure turbine rotors are mounted on a first high-pressure shaft, while the low-pressure compressor and low-pressure turbine rotors are mounted on a second, low-pressure shaft which is received within the interior of the first shaft, concentric therewith. The two shafts are supported on several sets of bearings which in conventional engines are attached to and supported by various frame assemblies.

It is a continuing goal of gas turbine engine designers to reduce the weight of such engines without sacrificing the thrust output thereof. Recently, there has been an effort to reduce the weight of such engines by reducing the physical size thereof, making up for any reduction in flow area through the engine by an increase in shaft operating speeds. Thus, as modern engines become more compact for the amount of thrust they produce, there becomes less and less room within the interior of the engine to accommodate such structures as these individual bearing frames.

Recent innovations in gas turbine engines architecture have resulted in "mid-turbine frame" arrangements. In such mid-turbine frame arrangements, the most downstream bearing for the high pressure turbine is moved from radially inwardly of the engine's combustor, a location which, due to the compactness of modern engines, is no longer large enough to accommodate the bearing, to a location downstream thereof between the low and high pressure turbines. The most downstream bearing for the low pressure turbine shaft is moved in an upstream direction, closer to the high pressure shaft bearing so that both bearings may be supported by a single frame assembly and housed within a single bearing housing, thereby reducing engine weight substantially.

Such a mid-turbine frame arrangement requires a strut to transmit mechanical bearing loads from the bearing frame to the engine's case, typically, where the case attaches to a mount by which the engine is connected to an associated pylon and also to accommodate aerodynamic vibratory loading as well. This strut must therefor extend through the hot gas path between the high and low-pressure turbines where it is exposed to gas temperatures as high as 2000° F. or higher. Those skilled in the art will appreciate that accommodating such high heat loads in those struts is critical. While making such struts hollow to accommodate the flow of cooling air therethrough may suggest itself, hollowing out such struts will necessarily weaken them, thereby detracting from the struts' ability to carry the high mechanical loads placed thereon by the bearings. Increasing the mass of the struts to handle such high mechanical bearing loads and accommodate the high thermal loading thereof as well, would necessarily severely increase the strut's weight and therefore be contrary, the goal of reducing the weight of the engine.

Also disposed within the hot gas path between the high and low-pressure turbines are inlet guide vanes. These are aerodynamic structures which turn the exhaust from the high-pressure turbine to an optimal direction for entry into the low-pressure turbine. Since such guide vanes only accommodate aerodynamic loading (both steady state and transient) from the gases passing through the turbine and not the much higher mechanical loading from the bearings as do the struts described hereinabove, such guide vanes tend not to be as mechanically robust as the struts.

It is the current practice to use separate struts and low-pressure turbine inlet guide vanes since the performance requirements of the two are so different. Using separate struts and inlet guide vanes imposes a significant restriction on the flow of working fluid from the high to the low-pressure turbine and adds significant weight to the engine. Accordingly, a combined strut and low-pressure turbine inlet guide vane would be desirable but, heretofore, the diverse load (aerodynamic and mechanical) and temperature handling requirements of those two components have rendered the integration thereof into a single component difficulty if not impossible to achieve.

DISCLOSURE OF THE INVENTION

The present invention comprises a variable geometry inlet guide vane which provides the necessary working gas flow alignment while accommodating the extreme mechanical loading from a mid-turbine bearing frame in a light weight and compact assembly.

The guide vane of the present invention includes an internal mechanical load carrying spar which effectively transmits bearing loads through the hot gas path to an engine mount, spaced internally from a lightweight variable geometry, aerodynamic shell which provides the necessary directional alignment of gas flow to an associated turbine or compressor throughout varying engine operating conditions (aerodynamic and vibrating loads). A gap between the spar and the shell may accommodate cooling airflow therethrough to cool the guide vane from the extreme heat loads present in gas flow when the guide vane is employed in conjunction with a turbine. The gap also accommodates an actuation mechanism which connects to the interior of the shell and when actuated, adjusts the aerodynamic shape of the shell. In the preferred embodiment the actuation mechanism comprises a cam-actuated, four bar linkage grounded to the spar and attached at, at least one output link thereof, to the interior of the shell. Movement of the output link adjusts the position of an associated portion of the aerodynamic shell, thereby adjusting the shape thereof to optimize load balancing between the pressure and suction surfaces thereof and to "tune" the shape of the shell to varying operating conditions of the engine to enhance the performance thereof.

To reinforce the spar and thereby minimize the mass required to accommodate thereof mechanical load, the spar is provided with stiffeners around its periphery to which the linkage may be grounded.

DETAILED DESCRIPTION OF THE INVENTION

Figure 1:
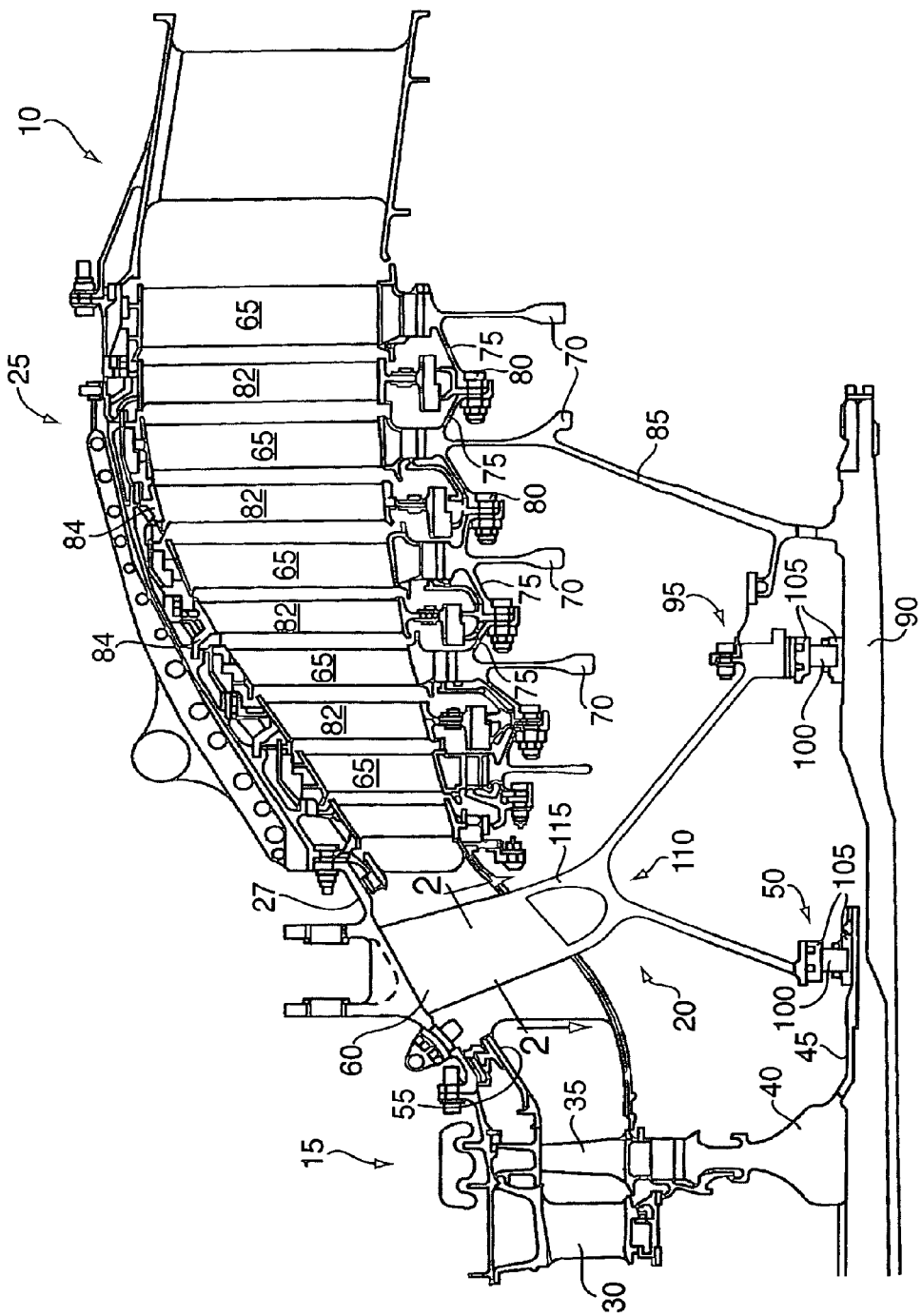
FIG. 1 is a simplified elevation of the turbine section of a modern gas turbine engine, employing the variable geometry guide vane of the present invention located at the inlet to the low pressure turbine.

Referring to the drawings and particularly FIG. 1 thereof, the turbine section of a modern gas turbine aircraft engine is shown generally at 10. Turbine section 10 comprises a high-pressure turbine section 15, mid-turbine bearing frame 20 and low-pressure turbine section 25 all disposed within the engine's case 27.

High-pressure turbine 15 comprises an inlet guide vane 30 which properly aligns exhaust gases from the combustor (not shown) with the inlet of the high-pressure turbine. The high-pressure turbine itself comprises one or more rows of turbine blades 35 mounted on the rim of a disk 40 in a manner well known in the art. Disk 40 is attached in any known manner to hollow high-pressure shaft 45 supported at the end thereof by high pressure bearing assembly 50.

High-pressure turbine 15 exhausts into an annular flow channel 55 which accommodates the turbine inlet guide vane 60 of the present invention. Guide vane 60 turns the working fluid exhausted from high-pressure turbine 15 into proper alignment with the inlet of low-pressure turbine 25. Low pressure turbine 25, in a manner well known in the art, comprises a number of rows of blades 65 each row mounted on a respective disk 70, the disks 70 being bolted together at spacer arms 75 by bolts 80 in a manner well known in the art. The blades are each disposed between adjacent stationary vanes 82 mounted within case 27 by suitable mounting structures 84. One or more of disks 70 may comprise an extension 85 of low-pressure shaft 90 which is accommodated within the interior of high pressure shaft 45 and supported on bearing assembly 95.

Bearing assemblies 50 and 95 may be of any variety known in the art such as a plurality of bearing rollers 100 which contact the shafts and are radially accommodated within annular races 105. The bearings may also be provided with various housings, lubrication systems, etc. which, for clarity, are not illustrated herein. Bearing assemblies 50 and 95 are each disposed at the end of a bearing support structure 110.

Bearing support structure 110 transmits the mechanical loading from shafts 45 and 90 to an engine mount 115 (in the present invention, comprising a clevis) formed as part of engine case 27. The path of such loading is through the low-pressure turbine inlet guide vane 60 of the present invention.

Figure 2:
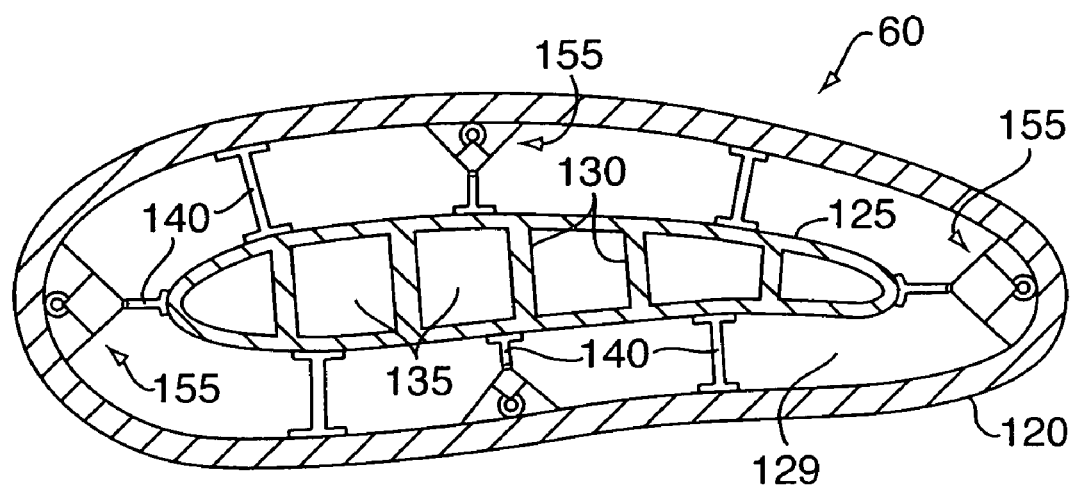
FIG. 2 is a sectioned plan view of the inlet guide vane of the present invention taken in the direction of line 2-2 of FIG. 1.

Referring to FIG. 2 along with FIG. 1, inlet guide vane 60 of the present invention comprises an aerodynamic outer shell 120 which turns the working fluid exhausted from the high-pressure turbine into the proper alignment with the inlet of the low pressure turbine in any manner well known in the art. Shell 120 may be formed from any known high temperature material such as any of various known cobalt alloys. A mechanical load-bearing spar 125 is spaced from shell 120 by a gap 130 which may accommodate a flow of cooling air therethrough. Spar 125 is formed from any of a number of known high mechanical strength materials such as various titanium alloys. The spar may be cast integrally with bearing support structure 110. As set forth hereinabove, to minimize the weight of the mid-turbine bearing frame assembly, it is desirable to render spar 125 as compact and lightweight as possible. Therefore, the spar is preferably formed with a hollow interior which may be strengthened by a plurality of ribs 130 which may be cast integrally with the spar. The spacing 135 between the ribs 130 may accommodate various engine service lines such as electrical lines, pneumatic and hydraulic plumbing, etc.

Further contributing to the compact and light-weight characteristics of the spar, are a plurality of spar stiffeners 140 which run longitudinally along the outside of the spar and may be attached thereto by welding or similar techniques or integrally cast with the spar from the same material thereof. In the preferred embodiment, stiffeners 140 are generally T-shaped in cross-section including a base 145 located at the spar surface and a fin 150 extending into the air gap from the base toward aerodynamic shell 120. Fin 150 functions as a cooling fin which aides in convective removal of heat from the spar by the flow of cooling air through gap 130.

Figure 3:
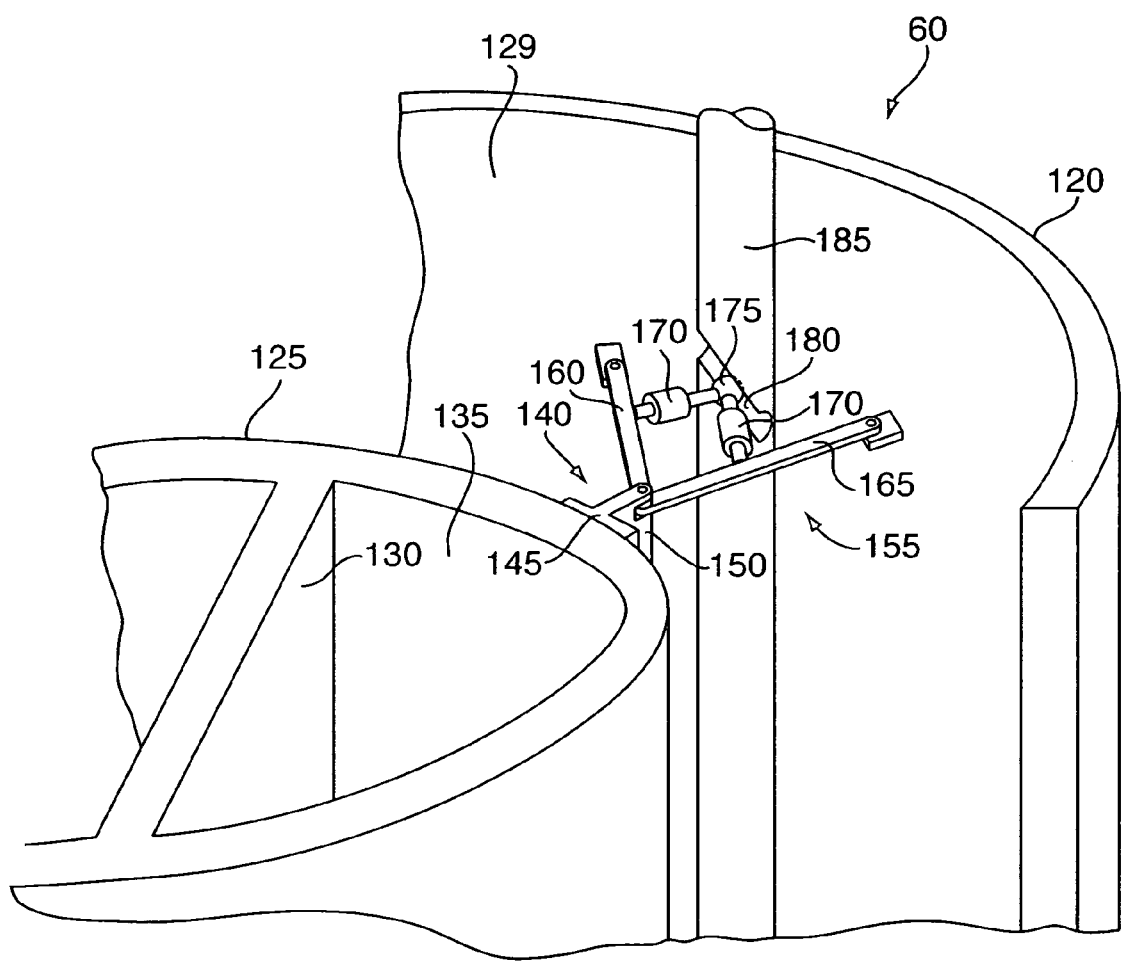
FIG. 3 is an enlarged simplified isometric view of a portion of the inlet guide vane of the present invention.

Referring to FIGS. 2 and 3 the spar, at the outer surface thereof at spaced locations around the perimeter and along the spar thereof or, at the end of various fins 150 of stiffeners 140, has grounded thereto, a number of four bar linkages one of which is shown at 155, comprising a pair of rigid links 160 and 165 pivotally mounted at corresponding first ends thereof, to the spar (or stiffener fins as the case may be) and at corresponding seconds ends thereof to an interior surface of airfoil shell 120. Disposed between links 160 and 165 and semi-rigidly connected normal thereto (89°-92°) are a pair of semirigid links (oleo struts or shock absorbers) 170 each which, at an end opposite from that which connects to an associated rigid link 160 or 165, terminates at a cam follower 175 such as a ball-follower.

Preferably, the guide vane of the present invention is provided with a plurality of such linkages spaced along the length of the guide vane at, for example, at 5%, 25%, 50%, 75%, and 90% of the vane's span.

Referring to FIG. 3, each of the ball followers are each received within an associated contoured cam slot 180 in a cam rod 185 which is rotationally movable by any suitable screw actuator or motor (not shown) such as any of known electric, hydraulic, pneumatic or equivalent motors or actuators. Each of the cam slots 175 is generally helical, follower ball being held in engagement therewith by a spring or other resilient member (not shown) in the semi-rigid links 170.

Referring particularly to FIG. 3, those skilled in the art will recognize that as cam rod is rotated the engagement of the ball follower with the contoured cam slot 180 in shaft 185 will cause the semi-rigid links 170 to pull or push on their associated rigid links 160 and 165 causing links 160 and 165 to pivot on the spar and draw the airfoil shell wall inward or push on the wall outwardly.

Figure 4:
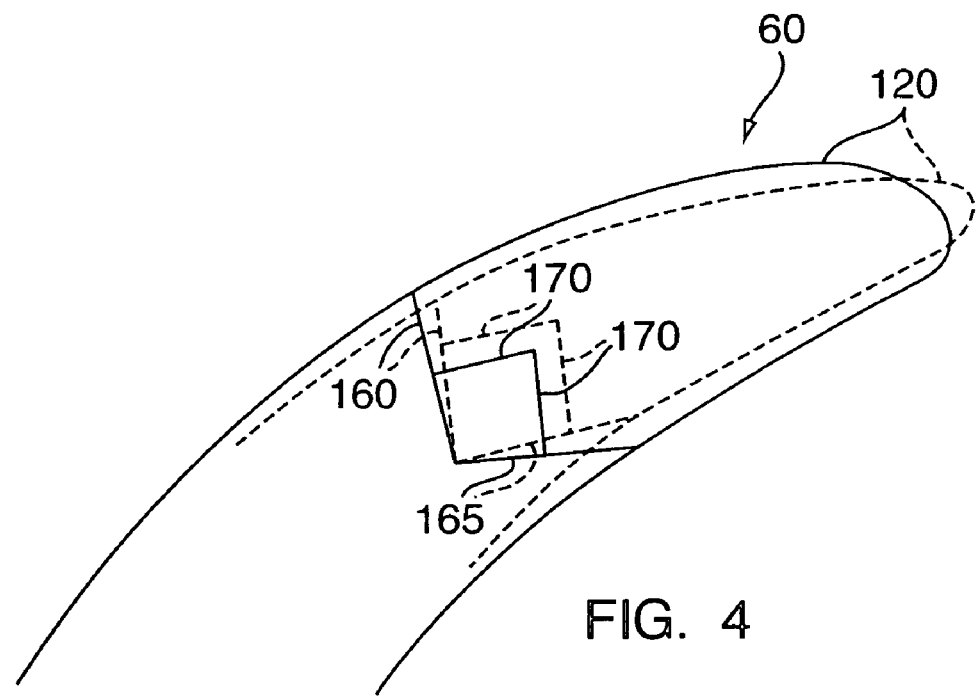
FIG. 4 is a schematic view of the guide vane of the present invention undergoing a change in aerodynamic shape thereof in response to operation of an actuation mechanism associated therewith.

Referring to FIG. 4, for illustrative purposes, the followers on the linkage at the trailing edge of the airfoil shell are shown to have both moved in a downstream direction with respect to the flow of working fluid over the guide vane, drawing both the semi-rigid links and thus, associated rigid links inwardly toward the chord line of the vane, thereby reducing the vane in thickness at the trailing edge thereof whereby, the trailing edge of the vane may assume the position shown when acted upon by flow thereover.

Thus it will be appreciated that the guide vane of the present invention provides an effective arrangement for adjusting the shape of an aifoil shell of the guide vane for tuning the vane shape for optimal performance in the face of varying flow conditions over the surface of the vane, for enhanced load balancing (and thus internal stress minimization) between the pressure and suction surfaces thereof and for enhanced response to vibrating and other transient loads.

While a preferred embodiment of the present invention is illustrated herein, it will be appreciated that various modifications thereof will suggest themselves to those skilled in the art. Thus, while the guide vane of the present invention is illustrated and described herein within the context of a mid-turbine frame engine architecture, it will be understood that the guide vane hereof may be used with equal effectiveness with any known turbine or compressor architectures. Similarly, while a specific number and placement of linkage have been illustrated, it will be understood that any quantity of linkages spaced at desired locations around the interior of the airfoil shell may be employed as determined by the range of engine operating conditions which the vane will encounter. Also, while a particular cam shape which adjusts the linkages to narrow or widen the airfoil shell, has been shown, it will be understood that any appropriate of cam shape may be employed to narrow, widen, bend, or otherwise adjust the shape of the airfoil shell. Furthermore, while the airfoil shell has been illustrated as a continuous shell, which relies on its own elasticity to change shape under the influence of the actuation of the linkages, it will be appreciated that changes in the airfoil shape may be accommodated by various other arrangements such as a multiplicity of individually movable plates, etc. Moreover, it will be understood that while the preferred linkage arrangement employs semi-rigid links as the input links in the four bar linkage, it will be understood that it may be possible to substitute rigid links in their place where transient response of the linkage and manufacturing tolerance associated therewith, permit.

Accordingly, it is understood that the claims appended hereto will cover the above-noted and other modifications, as will suggest themselves to those skilled in the art.

The invention claimed is:

1. A guide vane for a gas turbine engine said guide vane comprising:
   an aerodynamic outer shell, adjustable in shape
   a mechanical load bearing structural spar received within said aerodynamic outer shell and spaced therefrom by an interior gap and
   at least one actuation mechanism disposed within said gap and connected to a portion of said outer shell and structural spar such that when activated, said actuation mechanism displaces said portion of said outer shell with respect to said spar thereby selectively adjusting the shape of said outer shell.

2. The guide vane of claim 1 wherein said actuation mechanism is grounded to said spar.

3. The guide vane of claim 2 wherein said actuation mechanism comprises a linkage including at least one output link pivotally connected at an outer end thereof to an inner surface of said outer shell.

4. The guide vane of claim 3 wherein said output link is grounded to said spar at an inner end thereof.

5. The guide vane of claim 4 wherein said actuation mechanism includes an input link connected at one end thereof to said output link at a medial portion thereof.

6. The guide vane of claim 5 wherein said input link is connected semi-rigidly to said output link, substantially perpendicular thereto.

7. The guide vane of claim 5 and wherein said actuation mechanism further comprises a cam disposed within said gap and a follower connected to said input link at a second end thereof and maintained in engagement with said cam such that movement of said cam causes movement of said follower and said input links thereby moving said output link to adjust the shape of said outer shell.

8. The guide vane of claim 7 wherein said cam comprises a slotted, generally cylindrical member in generally parallel disposition with respect to said spar, said slots accommodating said follower therein.

9. The guide vane of claim 5 wherein said input link is semi-rigid along the longitudinal axis thereof and a direction normal to said longitudinal axes.

10. A gas turbine engine comprising:
    high pressure turbine driven by a first shaft;
    a low pressure turbine driven by a second shaft,
    a working medium fluid flowing between said high and low pressure turbines through a gas path,
    said first and second shafts being mounted on a frame intermediate said low and high pressure turbines,
    the mechanical load of said frame being transmitted at least in part to an engine mount by a mechanical load bearing guide vane;
    said guide vane including an outer aerodynamic shell, the outer shape of said guide vane being adjustable to accommodate varying operating parameters of said engine, to counteract thermal distortion thereof and to effect aerodynamic load balancing.

11. The gas turbine engine of claim 10 said guide further including:
    a mechanical load carrying structural spar received within said aerodynamic outer shell and spaced therefrom by an interior gap and
    at least one actuation mechanism disposed within said gap and connected to a portion of said outer shell and structural spar such that when activated, said actuation displaces said portion of said outer shell with respect to said spar thereby selectively adjusting the shape of said outer shell.

12. The gas turbine engine of claim 11 wherein said actuation mechanism is grounded to said spar.

13. The gas turbine engine of claim 11 wherein said actuation mechanism comprises a linkage including at least one output link pivotally connected at an outer end thereof to an inner surface of said outer shell.

14. The gas turbine engine of claim 13 wherein said output link is grounded to said spar at an inner end thereof.

15. The gas turbine engine of claim 11 wherein said actuation mechanism includes an input link connected at one end thereof to said output link at a medial portion thereof.

16. The gas turbine engine of claim 15 wherein said actuator further includes a cam disposed within said gap and a follower connected to said input link at a second end thereof and maintained in engagement with said cam such that movement of said cam causes movement of said follower and said input link, thereby moving said output link to adjust the shape of said outer shell.

17. The gas turbine engine of claim 16 wherein said cam comprises a slotted, generally cylindrical rod in generally parallel disposition with respect to said spar, said slots accommodating said follower therein.

18. The gas turbine engine of claim 15 wherein said input link is semi-rigid in a direction generally parallel to the longitudinal axis thereof.

* * * * *